(12) United States Patent
Tonino et al.

(10) Patent No.: US 7,797,246 B2
(45) Date of Patent: Sep. 14, 2010

(54) DISTRIBUTED SYSTEM FOR ISSUING OFFICIAL STAMPS AND/OR TITLES APPLYING DEDICATED SMART CARDS

(75) Inventors: Giancarlo Tonino, Chiaverano (IT); Pier Domenico Di Benedetto, Turin (IT); Giovanni Quaranti, Banchette D'Ivrea (IT)

(73) Assignee: Telecom Italia S.p.A., Milan (IT)

( * ) Notice: Subject to any disclaimer, the term of this patent is extended or adjusted under 35 U.S.C. 154(b) by 1277 days.

(21) Appl. No.: 10/532,880

(22) PCT Filed: Oct. 30, 2003

(86) PCT No.: PCT/IT03/00703
§ 371 (c)(1),
(2), (4) Date: Apr. 28, 2005

(87) PCT Pub. No.: WO2004/040523
PCT Pub. Date: May 13, 2004

(65) Prior Publication Data
US 2006/0004678 A1     Jan. 5, 2006

(30) Foreign Application Priority Data
Oct. 30, 2002 (IT) ............................. TO02A0939

(51) Int. Cl.
*G06F 21/00* (2006.01)
*H04L 9/00* (2006.01)
(52) U.S. Cl. ..................... 705/60; 705/50; 705/51; 705/61; 705/65; 705/73; 235/380; 235/381
(58) Field of Classification Search ........................ None
See application file for complete search history.

(56) References Cited

U.S. PATENT DOCUMENTS 1,530,852 A     3/1925  Pitney (Continued)

FOREIGN PATENT DOCUMENTS

EP          0 400 917 A     12/1990

(Continued)

*Primary Examiner*—Calvin L Hewitt, II
*Assistant Examiner*—Mohammad A Nilforoush
(74) *Attorney, Agent, or Firm*—Venable LLP; Robert Kinberg; Steven J. Schwarz

(57) ABSTRACT

A distributed system (10) for issuing official stamps and/or titles (25), particularly stamps, comprising a central control unit or Service Centre (12), a plurality of local terminals (11) distributed throughout the land for materially issuing the official stamps and/or titles (25), and a plurality of smart cards (21) assigned to the operators of the local terminals (11), in which an initialization programme (40) is provided for initialising, in combination, a given local terminal (11) and a given smart card (21) of the system (10), in order to establish between that given terminal (11) and that given smart card (21) a bi-unequivocal type relationship of correspondence and cooperation, so that the given local terminal (11) and the given smart card (21), once initialised, are enabled within the system (10) to cooperate uniquely between one another to the exclusion of all other terminals and all other smart cards. In particular, this bi-unequivocal correspondence is set up by the initialisation programme (40) by "signing" or encrypting, through a secret key (35a) of the smart card (21), a data string (24a, 24b) defined by the target terminal (11) with which the smart card (21) is intended to exclusively cooperate.

10 Claims, 3 Drawing Sheets

U.S. PATENT DOCUMENTS

| | | | |
|---|---|---|---|
| 4,802,218 A * | 1/1989 | Wright et al. | 705/60 |
| 4,980,542 A * | 12/1990 | Jackson et al. | 235/375 |
| 5,111,030 A | 5/1992 | Brasington et al. | |
| 5,539,190 A | 7/1996 | Manduley | |
| 5,677,955 A | 10/1997 | Anderson et al. | |
| 5,917,924 A | 6/1999 | Herbert | |
| 6,199,752 B1 | 3/2001 | Bornemann et al. | |
| 2001/0000814 A1 | 5/2001 | Guthery et al. | |
| 2002/0165835 A1 * | 11/2002 | Igval | 705/401 |
| 2003/0097336 A1 * | 5/2003 | Cordery | 705/60 |

FOREIGN PATENT DOCUMENTS

| | | |
|---|---|---|
| EP | 0 856 821 A | 8/1998 |
| EP | 0 936 584 A | 8/1999 |

* cited by examiner

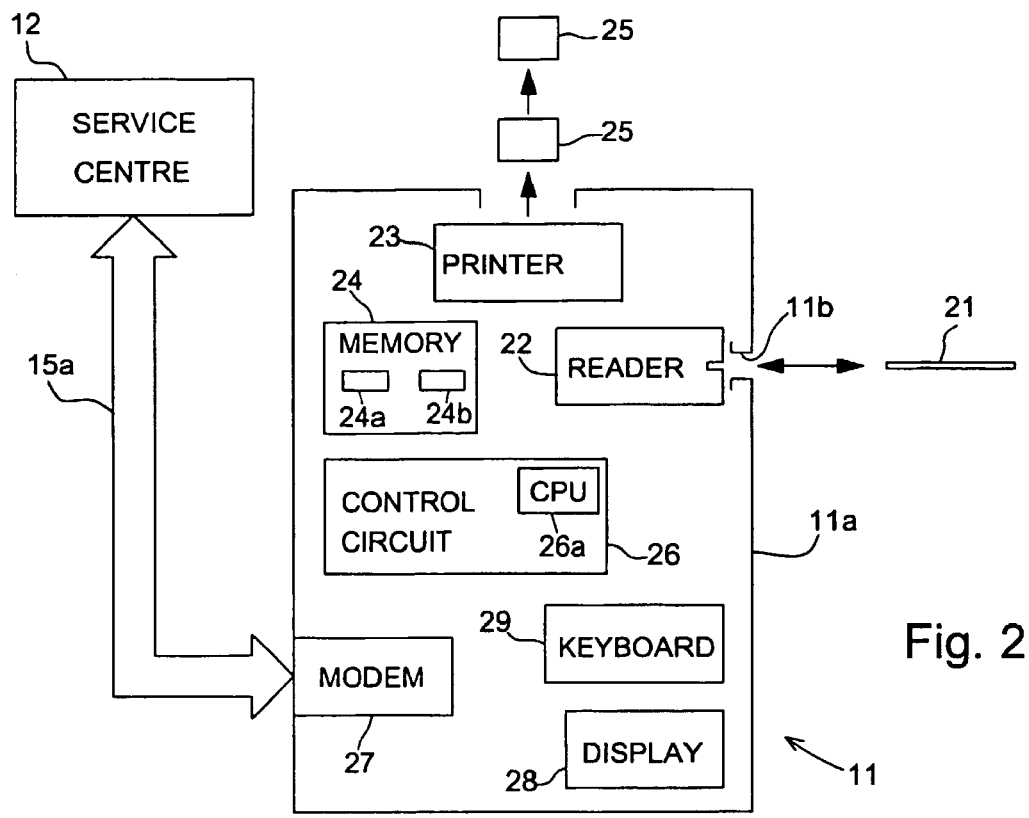
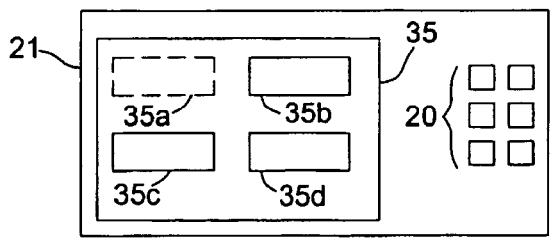
Fig. 2
Fig. 3
Fig. 4

DISTRIBUTED SYSTEM FOR ISSUING OFFICIAL STAMPS AND/OR TITLES APPLYING DEDICATED SMART CARDS

This application is a National Phase application of co-pending PCT/IT2003/000703, filed Oct. 3, 2003, which was published in English under PCT Article 21(2) on May 13, 2004, which claims the benefit of Italian Application TO 2002 A 000939, filed Oct. 30, 2002. These applications are incorporated herein in there entireties.

FIELD OF THE INVENTION

This invention relates generally to a distributed system for issuing official stamps and/or titles, particularly suitable for being used by those commercial and/or industrial and/or professional consumers who intend to issue directly themselves their own franking marks and their own official stamps, and with the nation-wide distributors, such as tobacconists, of official stamps for personal uses, particularly postage stamps.

More in particular, this invention pertains to a system comprising a plurality of terminals, distributed throughout the land, suitable for issuing official stamps and/or titles, and a corresponding plurality of smart, or activating, cards assigned to the operators of the single terminals.

This invention also relates to a local terminal and a corresponding smart card, suitably prearranged for operating as essential parts within a system, distributed throughout the land, for issuing official stamps and/or titles.

For simplicity's sake, in the course of the description, the term "official stamp" will be used very loosely to indicate a whole range of objects and titles, such as typically postage stamps and/or revenue stamps and/or stamped titles and/or labels generally and/or even simply impressions and/or other similar objects, suitable for use in validating and/or legalizing documents.

TECHNICAL BACKGROUND OF THE INVENTION AND STATE OF THE ART

Numerous types of mechanical, or electromechanical, or electronic or digital equipment, approved by the Postal Authorities, are currently known and available in commerce for the apposition of prints and/or stamps proving that the amount due for postage has been paid.

As everyone knows, this equipment, usually called franking machines, has been a great commercial success due to its ability to satisfy requirements of both security and practicality, in connection with the franking operations of large volume postal shipments.

In general, the systems automatically generating postage stamps are widely known and have been in application for some time, particularly ever since Arthur H. Pitney invented the first franking machine, corresponding to U.S. Pat. No. 1,530,852 of 24 Mar. 1925.

In the current state of the art, postal franking systems have become highly automated systems in which manual intervention has been reduced to the minimum.

Over the years, though there have been countless changes in the shape and structure of franking machines, one requirement has remained essentially unchanged and has constantly guided research, that of endowing postal systems with an ever greater degree of security against the risk of fraud.

It is essential in fact that, when the franking machine prints a stamp or a postal impression, it operates under conditions of absolute security, in order to avoid or at least minimize the risk of printing unauthorized stamps, and the consequent risk of seriously damaging the Postal Authority.

In the past, the main security measures implemented on franking machines were of a physical nature. For example, in mechanical franking machines, safety elements were applied to both the printing devices and the calculating devices. More recently, systems have been introduced that are based on the use of encryption techniques to ensure the validity of digitally printed postage stamps.

However the safety systems used or proposed have only reduced the risk associated with an unauthorized printing of postage stamps, and have not eliminated it entirely. This risk is borne entirely by the Postal Authority in both the case of stamps printed using pre-paid cards and in cases where remote payment systems are used.

Then there are other systems known from patents U.S. Pat. Nos. 5,111,030, 5,539,190, 5,917,924, 6,199,752, for the emission of franking marks and typically postage stamps, that involve the use of one or more smart cards, in order to ensure greater security in managing the data and equipment employed for generating postage stamps.

In particular, these solutions have in common the possibility of using a plurality of smart cards on the same franking machine, thereby permitting various users to make use of the franking machine.

Unfortunately however these solutions have the disadvantage of being somewhat complex and also not very versatile for producing a distributed official stamp issuing system.

To return to the current context, the franking market requires more direct and effective solutions for issuing at the places of use not only the stamp product, but also similar objects, such as for instance revenue stamps, and also solutions capable of allowing timely checking of the market trend by the service operator (Postal Authority).

In general, the solutions to these market requirements must satisfy various criteria, such as:
  elasticity of the service;
  reduction to the absolute minimum of the amount of cash tied up by the user or retailer, needed to be able to manage the issuing of official stamps;
  optimisation of the variety of sizes and denominations available so as to satisfy the user needs and/or the requirements of customers;
  variability of the graphic mark of the impression depending on the needs of the postal service operator; and
  possibility of customising the content of the impression, or at least a part of it, to allow it to convey advertising messages.

SUMMARY OF THE INVENTION

The primary object of this invention is therefore that of producing a system for issuing official stamps and/or titles, based on the use of a plurality of physically and logically protected, local terminals or franking machines, distributed throughout the land, which is capable of bettering the performances of the issuing systems offered by the current art, and which is in particular less complex and more versatile, and which is also capable of guaranteeing a higher level of security over time against the illicit use of franking machines for issuing official stamps and/or titles.

A further object of this invention is that of permitting, through the "real time" generation of official stamps, a substantial reduction in the amount of capital tied up in stocks of postage stamps and revenue stamps with the retailer or end user, and an optimisation of the variety of denominations of official stamps currently found in commerce.

The above-mentioned objects are achieved by the system for issuing official stamps and/or titles having the characteristics defined in the main independent claim, and in particular comprising a plurality of local terminals distributed throughout the land, and a corresponding plurality of smart cards assigned to the operator of the single local terminals, in which each terminal or franking machine is suitable for cooperating with a single, unique corresponding smart card, and vice versa.

In greater detail, in accordance with the system of this invention, the various terminals are provided for transmitting, via a communication network, to a central control unit (Service Centre), the data concerning the execution of local operations relative to the issuing of official stamps, whereas the smart cards in turn are intended to be used both as a means for unequivocally activating the corresponding individual terminals, and also as a means for identifying and validating the data by the terminals vis-à-vis the outside world.

BRIEF DESCRIPTION OF THE DRAWINGS

These and other characteristics of the invention will be discerned more clearly from the following description of a preferred embodiment, provided by way of non-restrictive example, with reference to the figures of the accompanying drawings, in which:

FIG. 2 represents a detailed block diagram of a generic local terminal belonging to the system of FIG. 1;

FIG. 3 represents a functional diagram of a generic smart or activating card suitable for cooperating with the terminal of FIG. 2;

FIG. 4 schematically represents an official stamp, for instance a stamp for postal delivery, issued by the local terminal of FIG. 2.

DETAILED DESCRIPTION OF A PREFERRED EMBODIMENT OF THE SYSTEM OF THE INVENTION FOR ISSUING OFFICIAL STAMPS AND/OR TITLES

Figure 1:
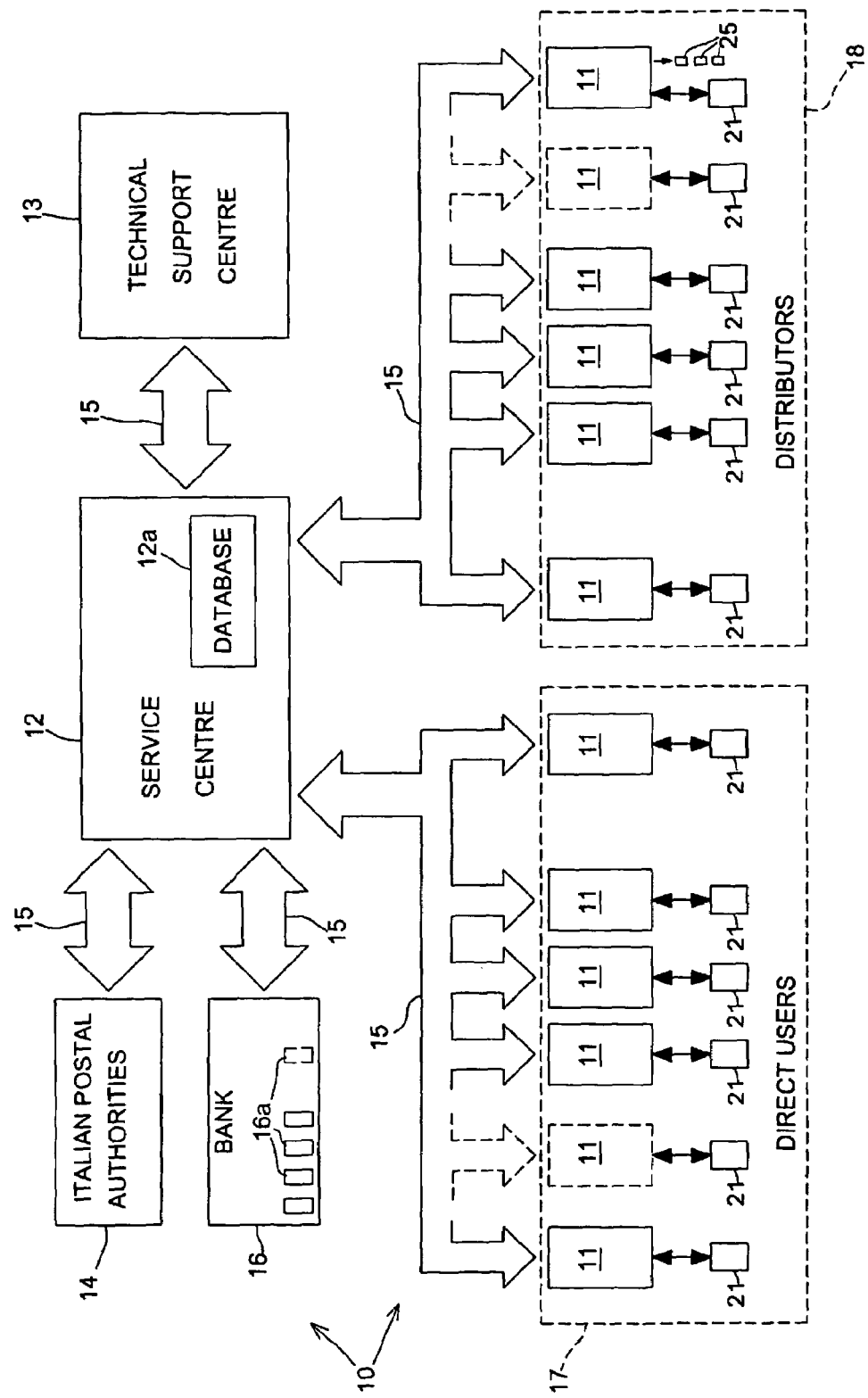
FIG. 1 represents a general block diagram of a system for issuing official stamps and/or titles, according to this invention, comprising a plurality of local terminals distributed throughout the land.

With reference to FIG. 1, a system according to the invention arranged for issuing official stamps and/or titles 25, hereinafter also called generically official stamps, is generally designated using the numeral 10, and comprises a plurality of parts suitable for cooperating among one another, through a communication network symbolically represented by double arrows 15, for exchanging data and information and for sharing resources and functions.

The official stamps and/or titles 25 that can be generated by the system 10 may be of various types and fulfil various purposes: for instance, they may consist of postage stamps for the delivery of parcels and/or documents by post, stamp marks or in general labels for validation and/or legalization of documents, or even simple impressions applied and/or printed on an item to be validated, and/or yet other objects.

The main parts of the system 10 include numerous local terminals 11, distributed throughout the land among the respective operators, which are provided for materially issuing the official stamps and/or titles 25; a Service Centre 12, also called simply central unit in the following, suitable for controlling from a central station the various terminals 11 and for performing control functions of the entire system 10; and a Technical Support Centre 13 associated with the Service Centre 12 and suitable for providing support functions for the system 10.

The system 10 also comprises, as an essential characteristic, a plurality of activating cards 21, physically distinct from the terminals 11 and assigned to the operators of the terminals 11, which are intended, as will be more fully described later, to be used by the same operators for the purpose of activating the terminals 11 and presetting them to perform the official stamp and/or title issuing operations.

These activating cards 21 are similar, in terms of their structural and functional characteristics, to the so-called "smart cards", which are now so ubiquitous on the market, and for this reason will indifferently be called either activating cards or smart cards in the following.

As stated earlier, smart cards are known and have been extensively applied for some time now, and therefore for reasons of conciseness will be described only summarily, while reference for any further details should be made to the technical literature available on the subject.

For clarity's sake, it is recalled merely that each smart card or activating card 21 has a well-defined structure and dimensions, conforming to internationally adopted rules and standards, and consists essentially of a flat, rectangular-shaped support made of plastic material, which incorporates an electronic microcircuit provided with computing and memorising functions.

The smart card 21 also has on its surface a plurality of contacts 20 (FIG. 3) suitable for establishing an electric connection with corresponding external contacts, when the activating card 21 is inserted in a respective reader, in order to allow the exchange of data between the reader and the same smart card 21.

Further details about the data recorded in the memory of a typical smart card will be supplied later, by describing an initialisation programme, envisaged by this invention, having the function of initialising a given local terminal 11 in association with a corresponding smart card 21.

The Service Centre 12 is in turn connected, for the purpose of exchanging data and information and sharing resources, to bodies and/or organizations already existing on the territory and suitable for operating in synergy with the system 10, such as for example the Italian Postal Authority (Poste Italiane), designated with the numeral 14, and to one or more Banks, for instance the Post Office Bank (Banco Posta), designated with the numeral 16, which have stipulated an agreement with the Service Centre 12.

In particular, the Banks 16 having an agreement with the Service Centre 12 are provided for accommodating and managing a plurality of accounts 16a, made out to the operators of the terminals 11 and having the purpose of accounting and keeping track of the cash transactions involved in the operations of issuing official stamps 25 through the terminals 11.

In accordance with the objects of this invention, the terminal 11 may be allocated, outside the Postal Offices, in a broad range of entities, offices and points of sale which, by the type of work they perform, use and/or consume large quantities of official stamps and/or titles. In particular, these entities, offices and points of sale may be subdivided as follows:

commercial, industrial, institutional and social users, professional studios, conventionally called "private users" or "direct users" and symbolically indicated by an area 17 delimited by a dashed line, who use directly for their own work a large quantity of official stamps, in particular postage stamps. Already today many of these users, having to deal with large volumes of correspondence for instance, have equipped themselves with equipment distributed and/or suggested by the Postal Authorities for directly issuing their own franking marks;

distributors of postage stamps and/or other official stamps for personal usage, symbolically indicated by an area 18 delimited by a dashed line, such as typically tobacconists, who generally distribute postage stamps in association with the sale of similar products or monopoly-controlled goods, at least in Italy. The system 10 of this invention would bring these distributors a certain advantage in economic and security terms, as better explained below.

For clarity in FIG. 1, the local terminals 11 distributed throughout the land are grouped in function of the two user typologies mentioned above.

The diagram of FIG. 2 is intended, with respect to the diagram of FIG. 1, to provide a more detailed representation of the structure of each terminal 11, and of the way in which it interacts with the other parts of the system 10.

In particular, FIG. 2 shows how, within the general communication network 15 of the system 10, each terminal 11 is associated with a respective communication line 15a, symbolically represented by a double arrow, for the purpose of being able to exchange data and information with the Service Centre 12.

From the structural viewpoint, each generic local terminal 11 comprises an outer casing 11a, schematically represented by a rectangle in FIG. 2, which supports and houses the various parts of the terminal 11; a reader 22 suitable for cooperating, for instance through a slot 11b in the casing 11a, with a corresponding smart card or activating card 21 having, as already stated, a plurality of functions and in particular that of activating the terminal 11; a printer 23 suitable for issuing externally to the terminal 11 a plurality of official stamps and/or titles 25, symbolically represented in FIG. 2 by rectangular labels; a memory unit 24 containing programs, data and information necessary for managing the operations of issuing official stamps and/or titles 25; an interface circuit 27, usually consisting of what is called a modem (coming from modulator-demodulator), provided for managing the communications, i.e. the exchange of data and signals, between the terminal 11 and the Service Centre 12 through the line 15a; a display 28 for displaying data and operations processed by the local terminal 11; a keyboard 29 for allowing the introduction by the operator of data and instructions in the terminal 11; and an electronic control unit 26 which comprises as a whole the electronic circuits, among which typically a microprocessor 26a or CPU (Central Processing Unit), responsible for controlling the general operation of the terminal 11.

The exchange of data between the terminal 11 and the Service Centre 12, through the line 15a, takes place according to transmission modalities and protocols which are widely known and tested, and which will not therefore be described herein.

The printer 23 is also of known characteristics, for instance of the thermal transfer type, and therefore suitable for generating the titles and/or official stamps 25 by thermal effect, selectively transferring ink from an ink ribbon to a paper printing medium.

Official Stamp

To improve the understanding of this invention, with reference to FIG. 4 some details will now be provided of the data and information figuring on an official stamp or label 25 issued by a generic local terminal 11 within the system 10.

It is emphasised that the following description will refer to an official stamp 25 configured as a common stamp, intended for validating documents to be delivered by post, solely for reasons of clarity and opportunity, without any restrictive intent.

In general, a stamp 25 issued by the system 10 of the invention possesses a material structure, a shape, and a layout of the relative printed data, that are substantially similar to those of the postage stamps issued by the automatic franking systems already known and currently applied.

To advantage, the stamp 25 may be printed by the printer 23 of the terminal 11 on a sheet of paper that has an adhesive side, thereby permitting easy application of the stamp 25 on the respective document to be delivered.

Alternatively, the stamp 25 may also be generated, by the printer 23, as an impression printed directly on the document to be delivered by post.

With regard, on the other hand, to the data figuring on the stamp 25, the latter, along a top side, has an area 25a that bears the symbol or logo of the Postal Authorities and, adjacent to the area 25a, a fluorescent strip 25b provided for security purposes and to allow management of the stamp by means of postal document automatic processing equipment.

The same stamp 25, below the area 25a, has a side area 25c that defines a bar code, conventionally represented as a chequerboard, and, below the strip 25b, an area 25d bearing the amount of the stamp 25.

The amount is printed on a reflecting background the purpose of which is to prevent the stamp 25 from being photocopied.

Furthermore, below the area 25d, the label 25 has a range of data the function of which is to identify the stamp, the corresponding type of postal service.

Finally the stamp 25 has a set of alphanumeric data, generically indicated with 25e, some of which in coded form, which is suitable for characterizing the stamp 25 and is in particular provided for performing security functions.

As is obvious from the above description, the label 25 has characteristics and a configuration that are easily adaptable and modifiable, in such a way that the 25 can be used, not only as a stamp for postal delivery, but also as a revenue stamp, or other official stamp, or still other title, within a wide range of possible official stamps and/or titles.

Description of Operation of the System According to the Invention for Issuing Official Stamps and/or Titles Operation will now be described of the system 10 of the invention for issuing official stamps and/or titles 25.

As a premise, it should be noted that the description that follows shall refer in the main to those parts of the operation of the system 10, such as an initialisation programme, which most qualify this invention with respect to the current art.

For completeness of information, the procedures provided by the system 10 which are substantially similar and/or identical to those envisaged by the current systems for franking and issuing official stamps will still be outlined, though only summarily, while the known art and the literature on the subject should be referred to for further details and anything not described herein.

In general, operation of the system 10 as a whole, and, in particular, the actual availability of a local terminal 11 for issuing official stamps and/or titles 25, are based on the presetting, in each terminal 11 of the system 10, of a protected, non-modifiable machine programme, and are also dependent upon a corresponding account 16a being opened and provided with funds at the Bank 16 having an arrangement with the Service Centre 12, by the operator of the terminal 11, and also upon the irreversible customisation by an authorised and acknowledged Authority, of a smart card 21 with the reference record to said account 16*a*.

In fact, only if said recognized bank deposit has been made and, naturally, a suitable sum of money entered in same, will the system 10 be able to support and manage the accounting of the cash debit and credit operations that are necessary for the subsequent operation of issuing official stamps and/or titles 25, managed autonomously by the terminal 11.

Initialisation Procedure and Programme

According to an essential characteristic of the system 10 in accordance with this invention, each local terminal 11, located at a corresponding user's, before it can effectively issue official stamps and/or titles 25 must be suitably initialised, during an initialisation or installation stage, in combination with a corresponding smart card 21, which in turn has already been suitably pre-arranged and customised, during what is called a pre-initialisation or personalisation stage, in such a way as to be unequivocally associated with a corresponding account or deposit 16*a* opened with the Bank 16 having an arrangement with the Service Centre 12.

Figure 5:
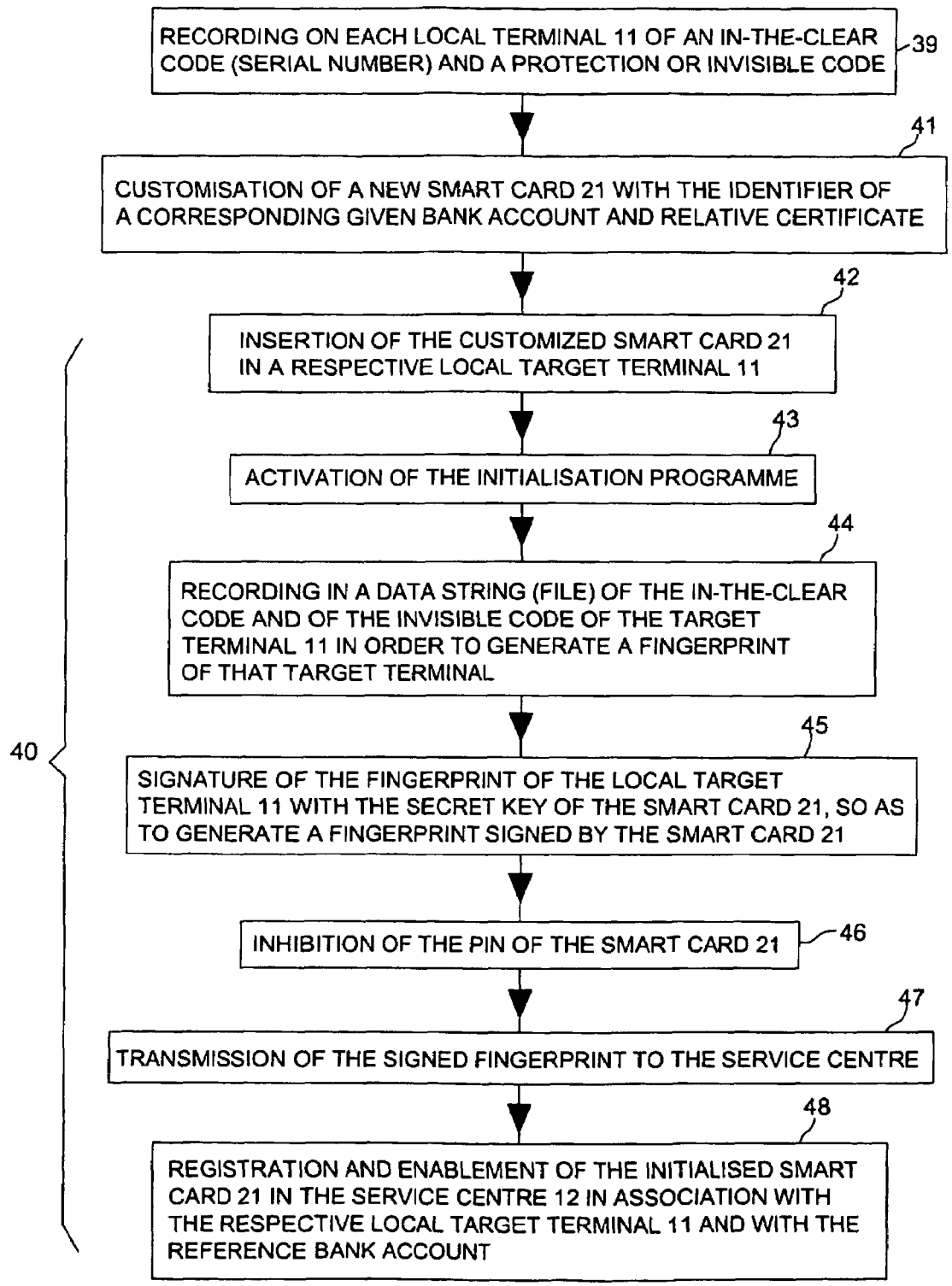
FIG. 5 is a flow chart of an initialisation programme used in connection with the system of FIG. 1 for initialising each local terminal in association with a corresponding activating card.

The initialisation stage true and proper includes the introduction of a smart card 21, already preset and customised, in a corresponding target terminal 11, and the subsequent activation of a special initialisation or installation programme, generically designated with the numeral 40 (FIG. 5).

This protected and non-modifiable initialisation programme or procedure 40, integrated in the system 10, and in particular already memorised or pre-loaded in the memory 24 of the terminal 11, is designed not only for managing the initialisation of the smart card 21 but in general for controlling both the interactions and data exchange between the smart card 21 and the corresponding local target terminal 11, and also the interactions and data exchange between the latter and the central unit 12, and therefore constitutes a true and proper machine programme, also called firmware, of the terminal 11.

This initialisation procedure is generally proposed by the system 10 in response to the introduction of a smart card 21, not yet initialised, in the respective target terminal 11, and can be executed at the command of the usual operator of the terminal 11.

However, without departing from the scope the invention, the initialisation procedure could also be executed, either at the place of installation of the terminal, or at an authorized centre, by specialist personnel, other than by the usual operator of the terminal 11 and in particular provided with an appropriate personal identification card released by the operator of the system 10 to enable them to perform the installation procedure.

While it is being executed, this special programme ensures that the smart card 21 and relative terminal 11 establish a special bi-unequivocal type of correspondence relationship, such that, once the initialisation stage is completed, the local terminal 11 is enabled for issuing the titles and/or official stamps 25, only after having recognized the corresponding smart card 21, and conversely the smart card 21 is suitable for use by the respective operator to enable only the corresponding terminal 21.

In particular this special and bi-unequivocal correspondence is based on the recording, in correspondence with the various parts involved in the initialisation procedure, i.e. the terminal 11, the respective activating card 21 and the Service Centre 12, of suitable data and/or identification and recognition codes that inseparably and unequivocally bind these parts to one another during use.

In other words, the initialisation programme creates, in anticipation of the future use of the terminal 11 for issuing the official stamps 25, an unequivocal and indissoluble bond between the said local terminal 11 and the corresponding smart card 21, in such a way that one will no longer be able to work or be used independently of the other and vice versa.

For an improved understanding of the invention and with reference to the flow diagram of FIG. 5, further information and details will now be provided about the programme and relative initialisation procedure 40, and how it is supported by the system 10.

It must first be pointed out that the system 10, of which this. initialisation or installation programme 40 constitutes an essential characteristic, is produced in such a way as to define a protected structure, placed under the exclusive control of the operator of the system 10, both from the physical viewpoint, i.e. in relation to the structural parts such as the circuits comprising the system 10, and from the logical viewpoint, that is in relation to the programmes that are integrated and are activated as part of the system 10.

As anticipated earlier, the effective execution of the initialisation programme 40 is preceded by a so-called pre-initialisation or customisation stage, designated with the numeral 41 in FIG. 5, during which the smart cards 21, still new, i.e. in the state in which they were supplied or manufactured, are preset and customised with a view to associating each of these with a respective account 16*a* opened with the Bank 16 having an arrangement with the Service Centre 12.

In particular this customisation is performed by recording on each smart card 21 data identifying the holder of the corresponding bank account 16*a*.

To facilitate understanding of the description, with reference to FIG. 3, some information will now be provided about the characteristics of a generic smart card 21, manufactured in conformity with the usual typologies and standards adopted for products of this type.

Each smart card 21 has within a memory 35 in which two data strings are memorised, indicated respectively 35*a* and 35*b*, each defining a key, of which a first key 35*a* is secret, i.e. embedded in the data recorded on the smart card 21, that may be utilized for data encryption operations, but not read or exported, and for this reason symbolized with a dashed-line rectangle, whereas a second key 35*b* is public, i.e. available, readable and exportable for the unencryption of the data encrypted with the first secret key 35*a*.

The presence of these two keys, one public and one secret, in a smart card, is used to support a double, asymmetrical key algorithm, as this algorithm is called by those acquainted with the sector art, in order to produce via the same smart card what is called an "electronic signature".

Furthermore, as required by the standards and by the Authorities that regulate and control the use of smart cards for signature operations, each smart card 21 contains, in its memory, a further string 35*c*, made in conformity with the X.509 standard, in which a plurality of data and information concerning the smart card 21 and its intended use is recorded.

This further data string 35*c* is electronically signed or certified by an authorized and recognized Body, and for this reason is also called "certificate".

In particular, the smart cards 21, used as part of the system 10 of this invention, are customized beforehand so that this further data string, or certificate, 35*c* contains a reference to a specific account or deposit, among those opened at the Bank 16 having an arrangement with the Service Centre 12 for the purpose of managing the cash transactions associated with the issuing of official stamps 25 by the terminals 11.

Yet again, each smart card 21 contains a further data string 35*d* defining an item of information comparable to a personal identification code, or PIN which stands for Personal Identification Number, and suitable for restricting usage of the smart card 21 to its holder alone.

As will be better understood in the following, the initialisation programme exploits this structure and layout of data, both known and secret, available and unavailable, present in a customary smart card, in order to be able to use it both as a means of activating the single terminal with which it is intended to cooperate, and also as a means of identifying and validating the data by the said terminal vis-à-vis the outside world.

In addition, in accordance with a characteristic of this invention, each local terminal 11, intended to be integrated in the system 10, is preset at the time it is produced so as to contain, recorded in its memory 24 (FIG. 2), information suitable for unequivocally identifying the same terminal 11. This presetting stage of each terminal 11 constitutes a kind of prerequisite for the execution of the initialisation programme 40 on the terminal 11, and for this reason is indicated with a label 39 placed at the head of the flow diagram of FIG. 5.

In particular this recorded information comprises a first code 24a, called "in the clear" or evident code, which is exactly corresponding to the serial number of the terminal 11 and is generally defined by a sequence number, and a second code 24b, called protected or invisible code, which is obtained in random manner through a special algorithm at the time of production of the terminal, and which for this reason is also called random code.

These two codes 24a and 24b, in the clear and invisible, are such as to unequivocally identify a given terminal 11 within the population of terminals belonging to the system 10, and for this purpose, before the initialisation stage, these codes are communicated in advance to the Service Centre 12, for updating its database 12a (FIG. 1).

In fact, in this way the Service Centre 12 has the possibility of knowing precisely which are the terminals 11 that belong to the system 10 and identifying them exactly.

As already said, in the beginning and during a stage 41 of pre-initialisation or customisation, the smart cards 21 are preset and associated, each with a respective bank account.

Accordingly, in correspondence with a stage 42, a smart card 21, thus preset but not yet initialised, is inserted in the reader 22 of a corresponding terminal 11, with which the same smart card 21 will have to indissolubly cooperate in future in order to activate and enable it to issue the official stamps 25.

At this point, the system 10 having recognized the presence in the terminal 11 of a smart card 21, customized but not yet initialised, the initialisation programme is ready to be activated and executed, as indicated by a label 43.

Now, while it is in execution, this programme activates a first stage 44 in which the visible code 24a, the invisible code 24b, plus any other information, such as for example the time and date at which the initialisation operation takes place, are combined and recorded in a data string, also called simply "file", in such a way as to define a so-called "fingerprint" of the terminal 11, i.e. information unequivocally associated with the said terminal 11.

At this point, the initialisation programme puts the fingerprint of the terminal 11, thus obtained, in relation with the smart card 21 inserted in the same terminal 11, so that the fingerprint is processed through the computing and memorising resources of the smart card 21.

In detail, during a step 45, the initialisation programme causes the fingerprint of the terminal 11 to be processed in combination with the secret key 35a embedded in the memory 35 of the smart card 21, so as to generate as a result, a new fingerprint, called "signed" as it has been encrypted via the signature defined by the secret key 35a of the smart card 21.

Clearly therefore this signed fingerprint has characteristics making it unequivocally associated with the combination of that given smart card 21 and that given terminal 11, which generated it.

In addition, in a stage 46, the initialisation programme interacts with the data recorded in the memory of the smart card 21, and in particular records a new, secret code, non available to the user, in this memory, in place of the previous personal identification code or PIN.

In this way the smart or activating card 21 is initialised, and at the same time the data string recorded therein and defining the PIN is no longer available to the user, but from then on passes under the exclusive control of the terminal 11 and therefore indirectly of the general system 10 of which the terminal 11 is a part. In other words, the PIN of the smart card 21 is inhibited to its owner, and made available only for the internal procedures of the system 10.

Finally, in a step 47, this fingerprint signed by the smart card 21 is sent to the Service Centre associated with the terminal 11.

The programme definitively shuts down the initialisation procedure by automatically activating, during a step 48, an operation of recording, inside the Service Centre 12, the public key associated with the activating card 21 which has been initialised.

During this recording, the public key of the activating card 21 is officially recognized on the basis of the known public key 35b and of the relative certificate 35c, enabled within the system 10, and also associated with that given terminal 11, in combination with which it has been initialised and with which it is destined for indissolubly cooperating in future.

In detail, the programme updates the database 12a of the Service Centre 12 so as to associate the public key 35b of the activating card 21 with the codes, already transmitted, which unequivocally identify that given terminal 11 within the population of terminals 11 belonging to the system 10, and to couple the same given local terminal 11 with the specific bank account 16a corresponding to the smart card 21 that has been initialised.

Again, in this step, the activating card 21 is enabled for activating requests connected with the use of the resources, such as the Technical Support Centre 13, connected to and intended for supporting the Service Centre 12.

The Service Centre, in turn, acquires the signed fingerprint from the smart card 21, with a view to using it as an identifying and recognizing means, when the user inserts the smart card 21 in the respective terminal 11 for activating the issuing of official stamps 25.

From what has been described, it will be clear that this initialisation programme or procedure has the effect of indissolubly and unequivocally binding a given terminal 11, a given activating card 21 intended for activating in the future solely that-given terminal 11, and the Service Centre 12 that performs the function of controlling and overseeing, from a central station, that given terminal 11 and the respective activating card 21.

It also results that, before this initialisation operation, any activating card 21, even if formally complete with data (keys, certification), cannot in effect be used for activating any terminal 11, nor for effecting a request for operations from the Service Centre, because it is not recognized by the system 10, and that it will only be suitable for use after this initialisation operation, but only in combination with the terminal 11 on which it has been initialised.

In other words, only after the initialisation procedure has been performed, will an activating card 21 effectively become utilisable in the system 10 for activating the issue of official stamps 25, and at any rate within the limits of use exclusively in combination with the terminal 11 on which it was initialised.

In particular, the activating card 21, once initialised, passes under the exclusive control of this target terminal 11, so that it may possibly be removed from the terminal 11 to disable its use, but it may not be used with the other terminals of the system 10.

It is clear therefore from what has been said that the recording of the system 10, and of each terminal 11, towards the outside world is subordinated to execution of the initialisation procedure.

Steady State Operation of the System of the Invention

Once the installation procedure has been completed, the terminal 11 and the corresponding smart card 21 are ready for working in strict and unequivocal association, within the framework of the system 10, for activating the customary operations of issuing the official stamps 25.

To this end, the operator will always and first of all have to insert in the reader 22 of a given local terminal 11 the corresponding, initialised smart card 21, so that the system 10 can recognize it as unequivocally associated with the terminal 11, and in response can enable the terminal 11 to issue the official stamps 25.

After recognition of the smart card 21 by the system 10, the operator may require the terminal 11, in particular by operating on the keyboard 29, to issue by means of the printer 23 the official stamps 25 of the desired type.

The latter may be, for instance, postage stamps, such as the one represented in FIG. 4, in accordance with the instructions and commands given by the operator to the terminal.

More in general, the normal operation of each terminal 11, in combination with the corresponding activating card 21, for issuing official stamps and/or titles 25, includes a vast range of operations and procedures which, as a general rule, are rolled out according to, and reproduce, steps already known and widely tried and tested. Therefore these operations and procedures, known in themselves, will not be described in detail, but only some summary information given about them.

In particular, upon each issue of an official stamp 25 by a given terminal 11, the system 10 will update the value of the sum of cash available on the account 16a associated with that given terminal 11 of issue, in function of the tariffs and amounts envisaged for the official stamps 25.

Furthermore, steady state use of the terminal 11 has allowance for periodic "topping-up" operations, through the Service Centre 12, of the account 16a associated with a given terminal 11.

In particular this topping-up consists in updating the credit totalizator inside the system 10 and in recording the details of the transaction in a memory of the system 10.

There is also provision for special procedures for management of the top-ups and relative compensations to the Bank 16, and also for special procedures designed for activating counter-measures against fraud, and in particular for producing statistics and conducting investigations to detect the presence of fraud.

Generally speaking, during the steady state operation of the system 10 subsequent to the installation procedure, the public keys of the single activating cards 21, already recorded in the database of the Service Centre 12 and of the Bank 16, are used for the identification of the requests, or at any rate of the data, coming from the terminals 11, and for their association with the relative account 16a opened at the Bank 16.

The public key of the activating card 21, recorded with the Service Centre 12, and its association with a unique local terminal 11, is also used for the implementation, under conditions of absolute security, of special service functions implying an exchange of data between the terminal 11 and the Service Centre 12 or the remote Technical Support Centres 13 (e.g. updating of services and tariffs tables, remote servicing, etc.).

It is also clear that the system 10 of the invention, by virtue of its characteristics, together with the inalterability of the machine programme installed on each terminal 11, allows the operation of issuing official stamps 25 by means of the terminals 11 to be limited to solely the residual credit remaining on the respective bank accounts 16a.

It is just as clear that the Service Centre 12 has the possibility of abundantly controlling the operations carried out autonomously by the single terminals 11.

The invention claimed is:

1. A distributed system for issuing printed objects, comprising:
   a central control unit;
   a plurality of local terminals for issuing the printed objects, the local terminals located at different geographic locations, wherein each local terminal includes a memory storing a clear code and a protected code;
   a communication and control network;
   a plurality of smart cards assigned to operators of the local terminals to activate and enable the local terminals to issue the printed objects, wherein each smart card includes a secret key and a personal identification code;
   wherein each of said plurality of local terminals includes a memory storing an initialization program that, when executed causes a terminal of the plurality of terminals to perform the steps of:
   generating a unique fingerprint of the local terminal by combining the clear code and the protected code,
   sending, to a smart card of the plurality of smart cards inserted in the local terminal, the generated fingerprint of the local terminal,
   generating a signed fingerprint by signing the fingerprint of the local terminal with the secret key of the smart card,
   replacing the personal identification code in the smart card with a new personal identification code in the memory of the smart card,
   sending the signed fingerprint to the central control unit.

2. The system of claim 1, wherein the initialization program is adapted to execute following a customization step that associates the given smart card with a given account.

3. The system of claim 1, wherein the initialization program is adapted to record the given smart card on the central control unit and enable the smart card for use with the given local terminal.

4. The system of claim 1, wherein the initialization program includes a double, asymmetrical key algorithm that signs the fingerprint of the given local terminal.

5. The system of claim 1, wherein the initialization program comprises a protected, non-modifiable, machine program installed on each of the local terminals.

6. The system of claim 1, wherein the initialization program is adapted to execute upon insertion of an uninitialized smart card into one of the local terminals.

7. The system of claim 1, wherein the printed objects are selected from the group consisting of postage stamps, revenue stamps, stamped titles, and labels.

8. The system of claim 1, wherein the given local terminal and the given smart card are adapted to perform local functions concerning issuance of the printed objects autonomously of the central control unit, and further wherein the given local terminal is adapted to transfer data relating to the local functions to the central control unit.

9. A method for issuing printed objects, comprising:
   providing a central control unit;
   providing a plurality of local terminals for issuing the printed objects, the local terminals located at different geographic locations, wherein each local terminal includes a memory storing a clear code and a protected code;
   providing a communication and control network;
   providing a plurality of smart cards assigned to operators of the local terminals to activate and enable the local terminals to issue the printed objects, wherein each smart card includes a secret key and a personal identification code; and
   initializing a smart card of the plurality of smart cards for use with a corresponding local terminal following insertion of the smart card in the local terminal, wherein the initializing step comprises:
      generating, by the local terminal, a unique fingerprint by combining the clear code and the protected code,
      sending by the local terminal to the smart card inserted in the local terminal, the generated fingerprint of the local terminal,
      generating, by the smart card, a signed fingerprint by signing the fingerprint of the local terminal with the secret key of the smart card,
      replacing, by the local terminal, the personal identification code in the smart card with a new personal identification code in the memory of the smart card, and
      sending, by the smart card, the fingerprint signed by the smart card to the central control unit.

10. A distributed system for issuing printed objects, comprising:
   a plurality of local terminals for issuing the printed objects, the local terminals located at different geographical locations, wherein each local terminal includes a memory storing a clear code and a protected code;
   a plurality of smart cards assigned to operators of the local terminals to activate and enable the local terminals to issue the printed objects, wherein each smart card includes a secret key and a personal identification code;
   wherein each of said plurality of local terminals includes a memory storing an initialization program that when executed causes a terminal of the plurality of terminals to perform the steps of:
      generating a unique fingerprint of the local terminal by combining the clear code and the protected code,
      sending, to a smart card of the plurality of smart cards inserted in the local terminal, the generated fingerprint of the local terminal,
      generating a signed fingerprint by signing the fingerprint of the local terminal with the secret key of the smart card,
      replacing the personal identification code in the smart card with a new personal identification code in the memory of the smart card,
      sending the signed fingerprint to a central control unit.

* * * * *